US009539996B2

(12) United States Patent
Kristinsson et al.

(10) Patent No.: US 9,539,996 B2
(45) Date of Patent: Jan. 10, 2017

(54) ENERGY MANAGEMENT CONTROL OF A PLUG-IN HYBRID ELECTRIC VEHICLE

(75) Inventors: Johannes Geir Kristinsson, Ann Arbor, MI (US); Hai Yu, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1622 days.

(21) Appl. No.: 12/977,439

(22) Filed: Dec. 23, 2010

(65) Prior Publication Data

US 2011/0166731 A1     Jul. 7, 2011

Related U.S. Application Data

(60) Provisional application No. 61/292,536, filed on Jan. 6, 2010.

(51) Int. Cl.
| | |
|---|---|
| *B60L 9/00* | (2006.01) |
| *B60W 10/00* | (2006.01) |
| *B60W 10/08* | (2006.01) |
| *B60W 10/26* | (2006.01) |
| *B60W 20/00* | (2016.01) |

(52) U.S. Cl.
CPC .............. *B60W 10/08* (2013.01); *B60W 10/26* (2013.01); *B60W 20/00* (2013.01); *B60W 2530/14* (2013.01); *B60W 2550/143* (2013.01); *B60W 2550/402* (2013.01); *Y02T 10/6269* (2013.01); *Y02T 90/14* (2013.01); *Y02T 90/168* (2013.01); *Y04S 30/12* (2013.01)

(58) Field of Classification Search
CPC ............................. B60W 10/08; G01C 21/26
USPC ........................................................ 701/22
See application file for complete search history.

(56) References Cited

U.S. PATENT DOCUMENTS

| | | | |
|---|---|---|---|
| 2002/0069000 A1 | 6/2002 | Nakao | |
| 2007/0029121 A1* | 2/2007 | Saitou et al. | 180/65.2 |

(Continued)

FOREIGN PATENT DOCUMENTS

EP     1975028     1/2008

OTHER PUBLICATIONS

Gong Q, Trip-Based Optimal Power Management of Plug-in Hybrid Electric Vehicles. IEEE Transactions of Vehicular Technology (Nov. 2008).*

*Primary Examiner* — Jelani Smith
*Assistant Examiner* — Charles J Han
(74) *Attorney, Agent, or Firm* — David B. Kelley; Brooks Kushman P.C.

(57) ABSTRACT

A drive-home button is provided in the dashboard of a plug-in hybrid electric vehicle (PHEV). The driver presses this button when heading home or to other predetermined destination at which charging is routinely performed. The actual route, the driving style, and other relevant vehicle/road information during the trip home are stored to build up a statistical database. During a present trip home, a highly probably route is predicted based on prior trips and an energy management profile is calculated. The commands to the internal combustion engine and the electric motor are selected to cause the vehicle's battery to be substantially discharged upon arriving at home based on actual data of energy usage by the operator of the vehicle during prior trips. By using actual data, the prediction of energy usage is more accurate allowing more complete discharge of the battery.

20 Claims, 5 Drawing Sheets

(56) References Cited

U.S. PATENT DOCUMENTS

| | | |
|---|---|---|
| 2007/0067101 A1* | 3/2007 | Krull et al. .................... 701/209 |
| 2008/0255722 A1* | 10/2008 | McClellan et al. ............. 701/35 |
| 2009/0114463 A1* | 5/2009 | DeVault ..................... 180/65.29 |
| 2009/0177383 A1* | 7/2009 | Tertoolen ...................... 701/208 |
| 2009/0228203 A1* | 9/2009 | Kawauchi ..................... 701/207 |

* cited by examiner

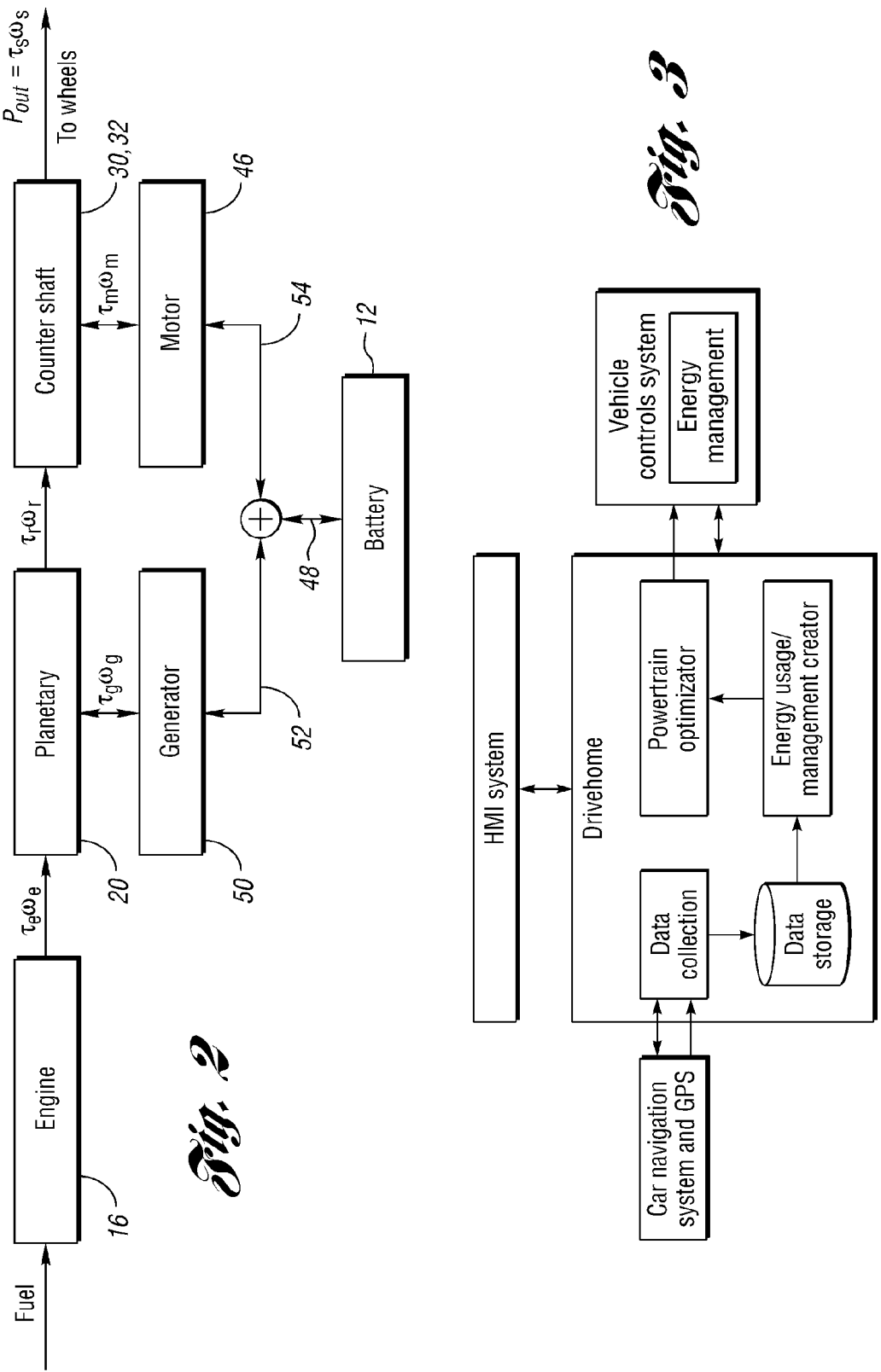

ENERGY MANAGEMENT CONTROL OF A PLUG-IN HYBRID ELECTRIC VEHICLE

CROSS-REFERENCE TO RELATED APPLICATIONS

This application claims the benefit of U.S. provisional application Ser. No. 61/292,536 filed Jan. 6, 2010, the disclosure of which is incorporated in its entirety by reference herein.

TECHNICAL FIELD

The present disclosure is related to electric energy management in a plug-in hybrid electric vehicle.

BACKGROUND

The power split hybrid electric vehicle (HEV) is a parallel hybrid electric vehicle. FIG. 1 shows the power split HEV powertrain configuration and control system. In this powertrain configuration, there are two power sources that are connected to the driveline: 1) a combination of engine and generator subsystems using a planetary gear set to connect to each other, and 2) the electric drive system (motor, generator, and battery subsystems). The battery subsystem is an energy storage system for the generator and the motor. FIG. 2 shows the possible power flows in this powertrain configuration.

In the first power source, as shown in FIG. 2, the engine output power can be split into two paths by controlling the generator-mechanical path $t_r\omega_r$ (from the engine to the carrier to the ring gear to counter shaft), and electrical path $\tau_g\omega_g$ to $\tau_m\omega_m$ (from the engine to the generator to the motor to the counter shaft). The way to split the engine power is to control the engine speed to a desired value, which results in a definite generator speed for a given ring gear speed, (or vehicle speed), because of the kinematics property of a planetary gear set.

The generator speed will change according to the vehicle speed for a definite engine speed, and the engine speed can be decoupled from the vehicle speed. The changing generator speed will vary the engine output power split between its electrical path and mechanical path. In addition, the control of engine speed results in a generator torque to react against the engine output torque. It is this generator reaction torque that conveys the engine output torque to the ring gear of the planetary gear set, and eventually to the wheels. This mode of operation is called "positive split". It is noted that because of the mentioned kinematics property of the planetary gear set, the generator can possibly rotate in the same direction of its torque that reacts against the engine output torque. In this operation, the generator inputs power (like the engine) to the planetary gear set to drive the vehicle. This operation mode is called "negative split". As in the case of the positive split mode, the generator torque resulting from the generator speed control reacts to the engine output torque and conveys the engine output torque to the wheels. Clearly, this combination of the generator, motor and planetary gear set is analogous to an electro-mechanical CVT. When the generator brake (shown in FIG. 1) is actuated (parallel mode operation), the sun gear is locked from rotating and the generator braking torque provides the reaction torque to the engine output torque. In this mode of operation, all the engine output power is transmitted, with a fix gear ratio, to the drivetrain through the mechanical path only.

In the second power source, the electric motor draws power from the battery and provides propulsion independently from the engine to the vehicle for forward and reverse motions. This operating mode is called "electric drive." In addition, the generator can draw power from the battery and drive against a one-way clutch coupling on the engine output shaft to propel the vehicle forward. The generator can propel the vehicle forward alone when necessary, and this mode of operation is called generator drive mode.

Operation of the power split powertrain system, unlike conventional powertrain systems, attempts to integrate the two power sources to work together seamlessly to meet driver demand without exceeding system limits (such as battery limits) while optimizing the total powertrain system efficiency and performance. Control between the two power sources is coordinated. As shown in FIG. 1, there is a hierarchical vehicle system controller (VSC) that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC determines when and how much torque each power source provides to meet the driver's torque demand and achieve the operating point (torque and speed) of the engine.

SUMMARY

A large portion of trips made with a private vehicle are trips to home. To optimize the electrical energy stored in the battery and the fuel energy consumed in the internal combustion engine, it is useful for the operator to indicate to the vehicle system controller their intended destination. Unfortunately, home is the destination to which the driver is least inclined to program the trip navigation system, since the driver already knows how to drive there from most locations. If the driver should need navigation assistance, it is for the first part of the trip, i.e., until within familiar territory. For plug-in hybrid electric vehicles (PHEVs), "home" is not only a well-known place, but is most often the "primary charge station." Therefore, in most cases, the remaining available electric energy can be expended to arrive home.

Furthermore, since "home" is very often a residential area, this is most likely the place where, if possible, the driver would like to be able to drive in all-electric-mode to minimize air-pollution and sound-pollution close to home.

If typical, learned, real-world driving patterns for trips home are used, energy management control algorithms of the PHEV can be optimized to improve fuel economy (or drivability) much better than statistical map-based data.

A drive-home button is provided in the dashboard of the car. The driver presses this button as soon as s/he is heading straight home. When it is pressed, two things happen. First, a controller in the vehicle stores the traveled route, the driving style in general and in relation to the particular roads, and other relevant vehicle/road information during the trip home. Such data are stored for all trips home to build a statistical database of driving patterns to home. In one alternative, the current time/day/week is also stored. Secondly, the Vehicle System Controller uses previously stored information to optimize the vehicle's drive home.

According to an embodiment of the disclosure, a HEV includes an internal combustion engine, an electric motor, an operator-actuated predetermined destination indicator, and a vehicle system control (VSC) electronically coupled to the engine, motor, and indicator. The VSC bases commands to the engine and motor on both the predetermined destination indicator having been actuated and data collected from prior trips to the predetermined destination. The system further includes a satellite based Global Positioning System (GPS) electronically coupled to the VSC. Data collected from prior trips to the predetermined destination include at least vehicle speed and torque demand as a function of location as determined by the GPS. In some embodiments, the data collected from prior trips to the predetermined destination also includes time of day and day of the week.

Also disclosed is a method to operate a PHEV in which an operator of the vehicle has indicated an intended destination by actuating a destination indicator coupled to the HEV; a most probable route to the indicated destination based on prior trips to the indicated destination is determined; and the PHEV is operated so that the battery is mostly discharged when the PHEV arrives at the indicated destination. The PHEV includes both an electric motor and an internal combustion engine and these are commanded to meet the desired objectives chosen by the driver. For example, fuel economy could be improved if the battery energy could be used over the whole trip and not primarily in the initial phase. Or the vehicle could operate on electrical mode near the home if the discharge of the battery occurs predominantly in a later portion of the route to the indicated destination. For all objectives, the indicated destination has battery charging capability and is a destination at which the operator commonly charges the PHEV.

To provide data on the prior trips to the indicated destination, the routes that an operator of the HEV chooses to travel in driving to the indicated destination are tracked and stored. The most probable route that the operator will travel to the indicated destination is then predicted based on statistical analysis of stored data of routes taken during prior trips. The destination indicator is a pushbutton coupled to an interior of the HEV within reach of an operator of the PHEV. Alternatively, the destination indicator is a user input associated with a driver display within the vehicle (e.g. a touch screen), or voice actuated.

The drive-home system: allows more advanced and accurate energy usage pre-planning, and enables prediction based energy management control for quasi-global energy optimization.

With the previously collected information, together with the route home from the navigation system and any dynamic information from environmentally aware systems (e.g. traffic updates or V2V/I2V data), the drive-home feature predicts the power usage distribution for the remainder of the trip. Since this driving pattern is based on statistical historical data, this is more precise than purely map-based or distance-based information, thereby providing a more accurate base for powertrain power optimization.

In some embodiments, an advanced mode of this feature presents a screen for the driver when a button is pressed. This screen allows the driver to select another "custom" point other than "home." In one alternative, the settings can be modified for the custom route. For example, a custom point could be "work" at which the PHEV may also be charged. The driver then may press the "work" button to allow optimization for this alternative destination. If nothing is selected, the default destination is assumed.

In one embodiment, the advanced mode can allow the driver to select among one or more predefined favorite locations. For example, one might use this extension to indicate driving home via the supermarket, or driving home including a detour to drop off a colleague. With this feature, the driver may plan a return-trip to and from home by entering the home as the ultimate destination, with work being an intermediate location. The vehicle operator may indicate an intermediate location or locations to the VSC at which the operator intends to stop prior to arriving at the indicated destination, which may be home or other charging location. Such intermediate locations are locations frequented by the vehicle operator, such as work, grocery, day care, etc. Based on data collected on prior extended trips, i.e., trips to the indicated location including the intermediate location, an extended-trip energy profile is predicted. The PHEV operation is commanded based on the extended-trip energy profile so that the battery is substantially discharged upon arriving at the indicated destination.

As the vehicle is driven, the system constantly updates its route, settings and optimizations to closely follow the current road and driving conditions of the route home, and to compensate if the driver takes a route other than the indicated route.

Since the system is activated directly on request from the driver only, no information is recorded without the driver's consent. The data stored can be used to deduce where the vehicle has traveled prior to arriving home. However, these data are not directly available for any other user.

BRIEF DESCRIPTION OF THE DRAWINGS

FIG. 2 is a powertrain system power flow diagram.

FIG. 3 is a schematic representation of a drive-home system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
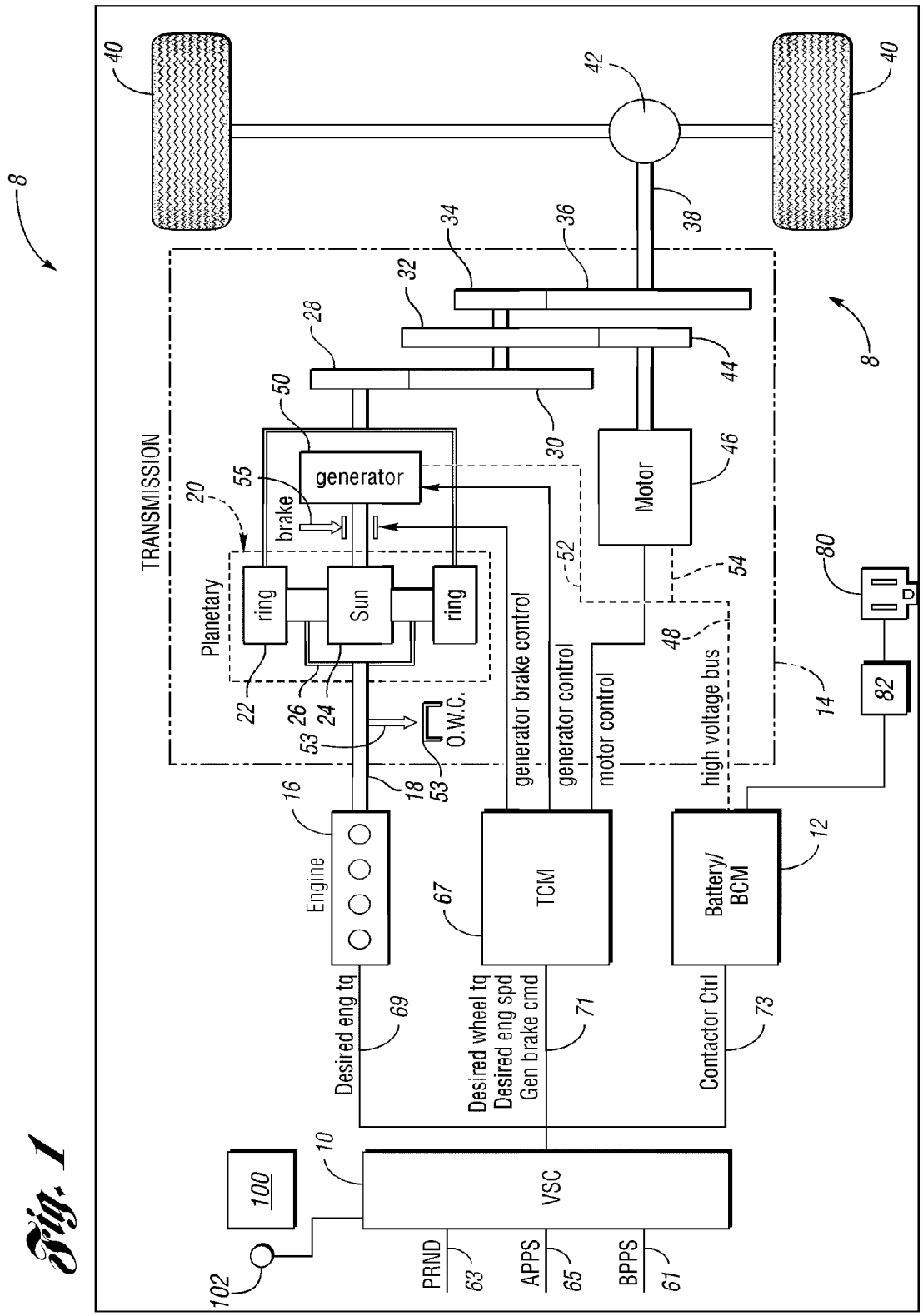
FIG. 1 is a schematic drawing of a power split powertrain system configuration.

An HEV 8 is shown schematically in FIG. 1. One type of HEV powertrain configuration is illustrated in FIG. 1. The control of the vehicle can be configured variously. In the example shown in FIG. 1, a vehicle system controller 10 communicates with a battery and battery control module 12, and a control module 67 for a transmission 14. An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery of module 12 delivers electric power to the motor through power flow path 48. Generator 50 is connected electrically to the battery and to the motor in known fashion, as shown at 52.

Assuming that there is a battery power request for charging, that request is considered a request for negative power. If the battery power request calls for discharging the battery, that request is considered a request for positive power.

When the powertrain battery of module 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal at 63 from a transmission range selector, which is distributed to transmission control module 67, together with a desired wheel torque, a desired engine speed and a generator brake command, as shown at 71. A battery contactor or switch 73 is closed after a vehicle "key-on" startup. The controller 10 issues a desired engine torque request to engine 16, as shown at 69, which is dependent on accelerator pedal position sensor output 65.

A brake pedal position sensor distributes a wheel brake signal to controller 10, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, wherein the battery acts as an energy storage medium for the generator and the motor.

The power flow paths between the various elements of the powertrain diagram shown in FIG. 1 is illustrated in FIG. 2. Fuel is delivered to the engine 16 under the control of the operator in known fashion using an engine accelerator pedal. Engine power delivered to the planetary gear unit 20 is expressed as $\tau_e \omega_e$, where $\tau_e$ is engine torque and $\omega_e$ is engine speed. Power delivered from the planetary ring gear to the countershaft gears is expressed as $\tau_r \omega_r$, which is the product of ring gear torque and ring gear speed. Power out from the transmission 14 is represented by the symbols $\tau_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2, by the power flow path 52. Similarly, power distribution between the motor and the countershaft gears can be distributed in either direction, as shown by the power flow path 54. Driving power from the battery or charging power to the battery is represented by the bi-directional arrow 48.

As shown in FIG. 2, engine output power can be split into two paths by controlling the generator speed. The mechanical power flow path, $\tau_r \omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. In which the engine 16 delivers power to the planetary gearing 20, which delivers power to the countershaft gears 30, 32 and 34, which in turn drive the wheels. A portion of the planetary gearing power is distributed to the generator 50, which delivers charging power to the battery at 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split in which the generator speed is negative and the generator torque also is negative.

The generator may deliver power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established in which the engine 16 is on and the generator is braked. The battery at 12 powers the motor 46, which powers the countershaft gearing simultaneously with delivery of power from the engine to the planetary gearing to the countershaft gearing.

The engine can deliver power only for forward propulsion because there is no reverse gear in the countershaft gearing. The engine requires either generator control or a generator brake to permit transfer of power to the wheels for forward motion.

The second source of power, previously described, is the battery, generator and motor subsystem. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

A plug-in hybrid electric vehicle (PHEV) is an extension of existing hybrid electric vehicle (HEV) technology, in which an internal combustion engine is supplemented by an electric battery pack and electric machines to further gain increased mileage and reduced vehicle emissions. A PHEV utilizes a larger capacity battery pack than a standard hybrid vehicle and adds the capability to recharge the battery from a standard electrical outlet to decrease onboard fuel consumption to further improve the vehicle's fuel economy in the electric driving mode or in the fuel/electricity blended driving mode. Referring once again to FIG. 1, if HEV 8 is a PHEV, it includes a receptacle 80 that is coupled to battery 12, possibly through a battery charger/converter/controller 32.

Conventional HEVs buffer fuel energy and recover kinematic energy in electric form to improve the overall vehicle system operating efficiency. The fuel is the only energy source. For PHEVs, there is one additional source of energy—the amount of electric energy deposited in the battery from the grid during battery charge events. A power management strategy for PHEVs has the potential to allocate the drive power demand between the two energy sources to achieve even better fuel economy or improved drivability while still satisfying all other objectives. While conventional HEVs are operated to maintain the battery state of charge (SOC) around a constant level, PHEVs use as much pre-saved battery electric (grid) energy as possible before the next battery charge event, i.e., it is desirable to fully use the relatively cheap grid supplied electric energy from each charge. After the battery SOC decreases to a lowest conservative level, the PHEV operates as a conventional HEV.

An embodiment of the system is shown schematically in FIG. 3. The drive-home system consists of three subsystems, an internal data storage, and additional software to integrate the parts. The subsystems are further described below. The drive-home system interfaces the car navigation system and GPS, the human-machine interface (HMI) system, and the VSC.

Referring back to FIG. 1, a driver interface 100 is coupled to VSC 10. Also, a drive-home indicator button 102 is coupled to VSC 10. Alternatively, button 102 is a selection available with the driver interface 100. Or, in other embodiments, VSC 10 queries the driver about whether the trip is to home and the driver answers by pressing interface 100 or vocally.

Figure 4:
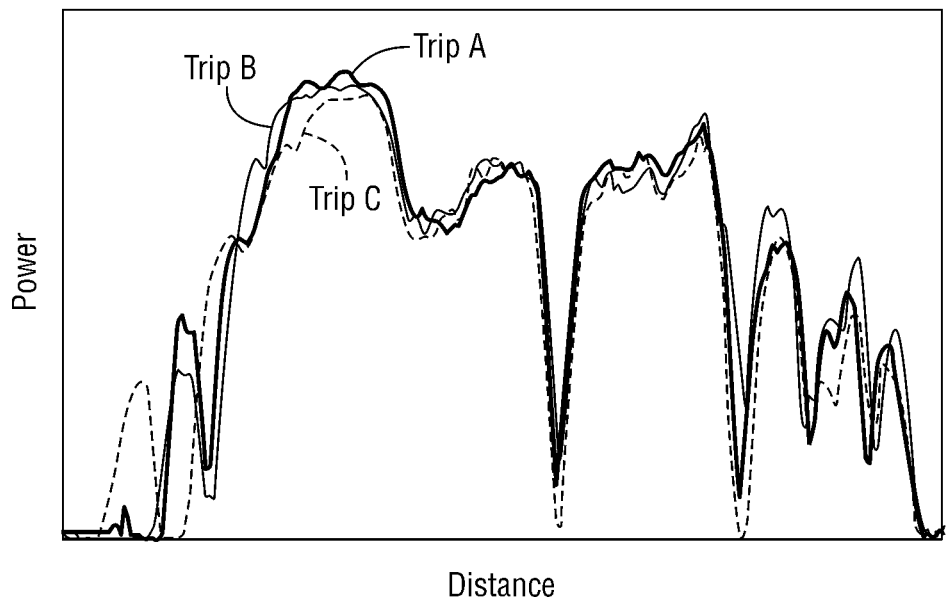
FIG. 4 shows power demand for three trips to a particular destination.
Figure 5:
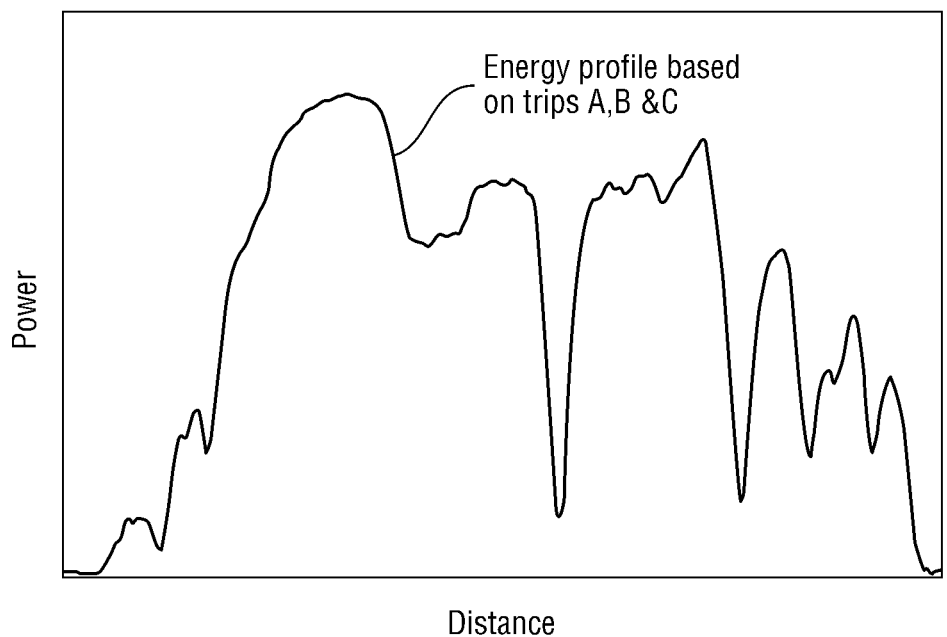
FIG. 5 shows the average power demand for the three trips of FIG. 4.
Figure 6:
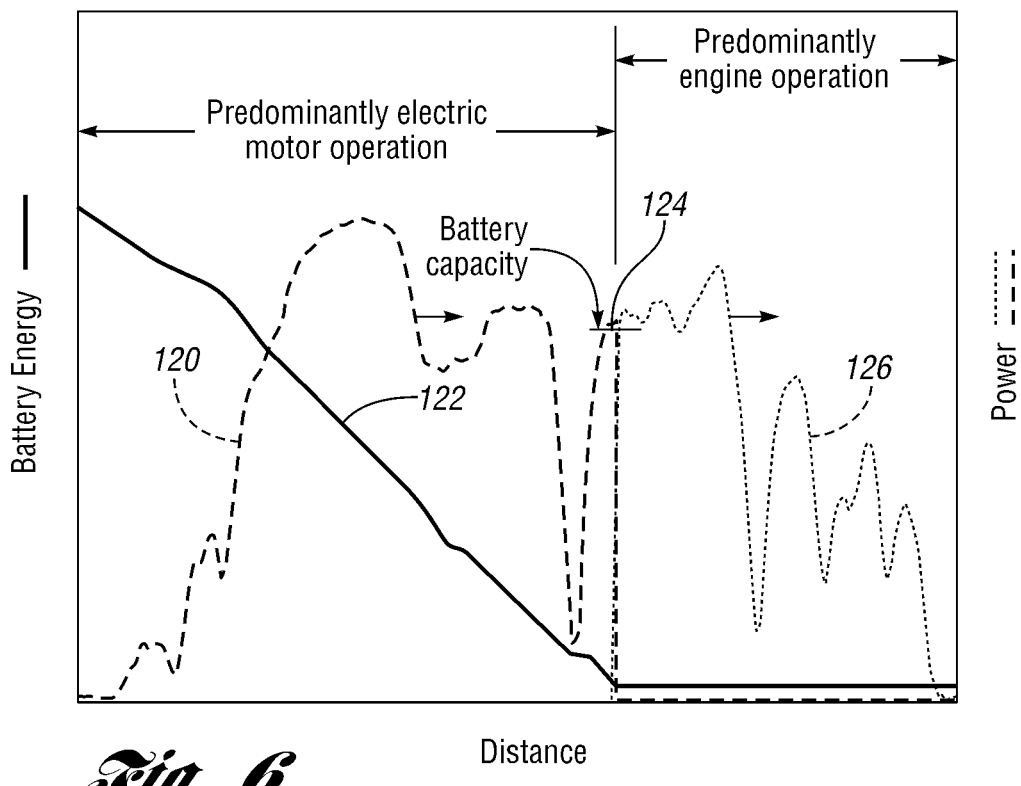
FIG. 6 shows one scenario for commanding the electric motor and the internal combustion engine to arrive at the particular destination.

In FIG. 4, the demanded power as a function of distance traveled to a particular distance for three trips are plotted. The drops in power are likely due to a stop light, stop sign, speed bump, as examples. In FIG. 5, an energy profile based on the three trips to the particular destination is shown. It is desirable to discharge the battery completely. If VSC 10 has no information as to the destination, then the battery is discharged early in the trip, as shown in FIG. 6. Dashed line 120 shows the amount of power expended by commanding the electric motor to provide much of the demanded power for an average trip. In many PHEVs, the engine rotates when the vehicle is operating above a particular speed. Rather than motoring the engine and incurring the large friction penalty, it is often desirable to operate the engine at least at a low torque output condition. Solid line 122 shows the cumulative power or energy expended in the trip associated with distance traveled. At point 124, battery capacity has been depleted and the remainder of the trip is powered by the internal combustion engine, as indicated by dotted curve 126. In such a scenario, electrical energy stored in the battery is expended in the electric motor preferentially early in the trip and the internal combustion engine is used later in the trip, which may exactly opposite to that desired. It may be desirable to utilize the electric motor preferentially near the end of the trip when the vehicle is in a residential neighborhood to avoid contributing to noise pollution.

During the trip after point 124 is accessed, the internal combustion engine is operated predominantly. There are several situations in which the electric motor may be employed. For example, when the engine cannot provide the demanded torque, the electric motor may supplement the engine for a brief period. Also, as a result of regenerative braking, electric energy is stored in the battery. To achieve the desired result of having a mostly discharged battery at the intended destination, the stored energy as a result of the regenerative braking is expended in the electric motor. Finally, if the demand is so low that the engine is operating at very low efficiency, it may be desirable to operate the engine at a higher power and to use the excess power to generate electricity, which also should be expended prior to completing the desired trip.

Figure 7:
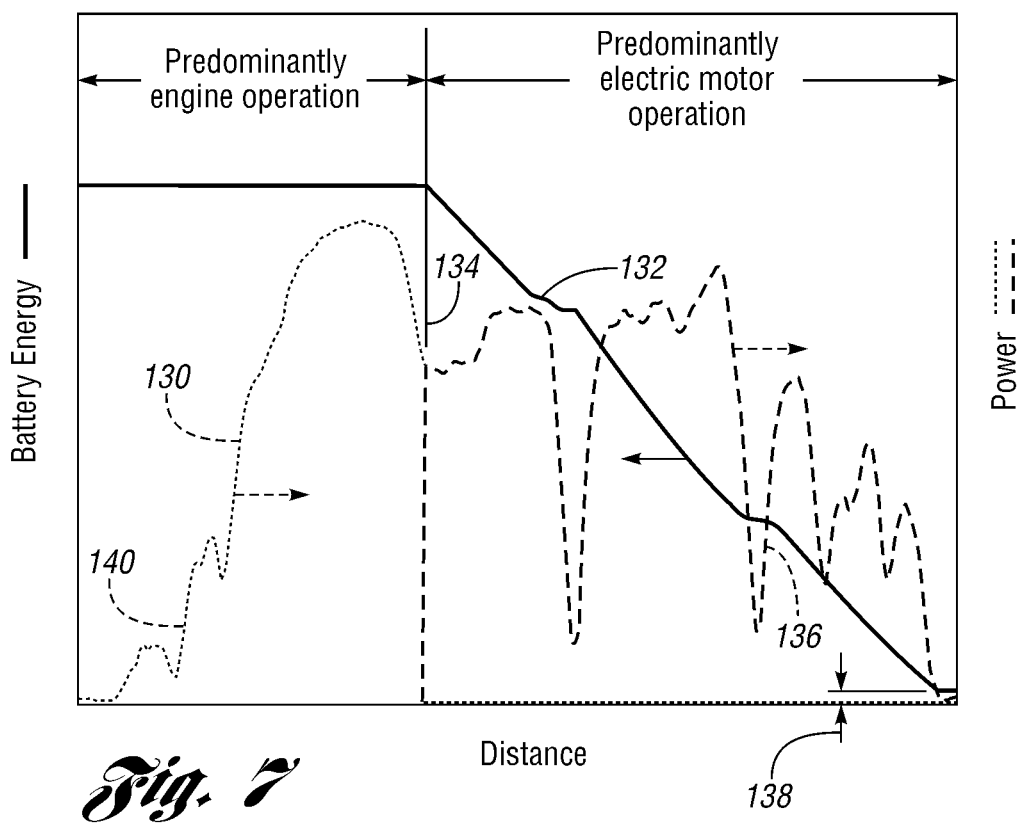
FIG. 7 shows an alternative scenario for commanding the electric motor and the internal combustion engine to arrive at the particular destination.

In FIG. 7, a more desirable scenario is illustrated. In such a scenario, the operator of the vehicle has indicated that s/he is driving home by depressing a button, voice activation, or other. In the early part of the trip to the particular destination, the engine is used predominantly to propel the vehicle, shown as dotted line 130. Solid line 132 shows energy stored in the battery. During operation of the engine, energy stored in the battery remains constant. That is, in the example in FIG. 7, if the battery is fully charged at the beginning of the particular trip, it remains at its maximum capacity. Based on the average power demand curve, such as that found in FIG. 5, the cumulative energy to complete the trip, as a function of distance, can be computed. When the energy that it takes to propel the vehicle under battery power for the remainder of the trip is approximately equal to that stored in the battery, the VCS switches over from engine propulsion to predominantly electric motor propulsion. Such point is shown as 134 in FIG. 7. The power demanded by the electric motor is shown as dashed line 136. In the example in FIG. 7, a small amount of energy is left in the battery, as illustrated by 138. As the amount of energy expended on an actual trip can deviate from the estimated amount of energy based on prior trips, it may be desirable to plan for nearly, but not completely, discharging the battery by the end of the trip to the particular destination. Furthermore, it is desirable to retain a small amount of energy in the battery to protect the battery and to supply torque to start the engine in the event that the vehicle operator changes his/her mind and deviates from the indicated destination.

The examples shown in FIGS. 6 and 7 are simplistic for illustration purposes. That is, in both situations, the vehicle is propelled predominantly by either the electric motor or the internal combustion engine. However, in an actual situation, both operate simultaneously at many operating conditions. Thus, for example, during the first part of the example trip illustrated in FIG. 7, it may be possible to operate under battery power until point 140 due to being at low speed and below the limits of battery power. For then on, the engine is operated possibly without electric motor supplement. As described above, the engine operates, in most PHEV configurations, beyond a particular vehicle speed. Thus, when the electric motor is operating predominantly, the internal combustion engine is often also operating at least at a low power output. The present disclosure is relevant to more complicated scenarios beyond what is shown in FIG. 7.

Figure 8:
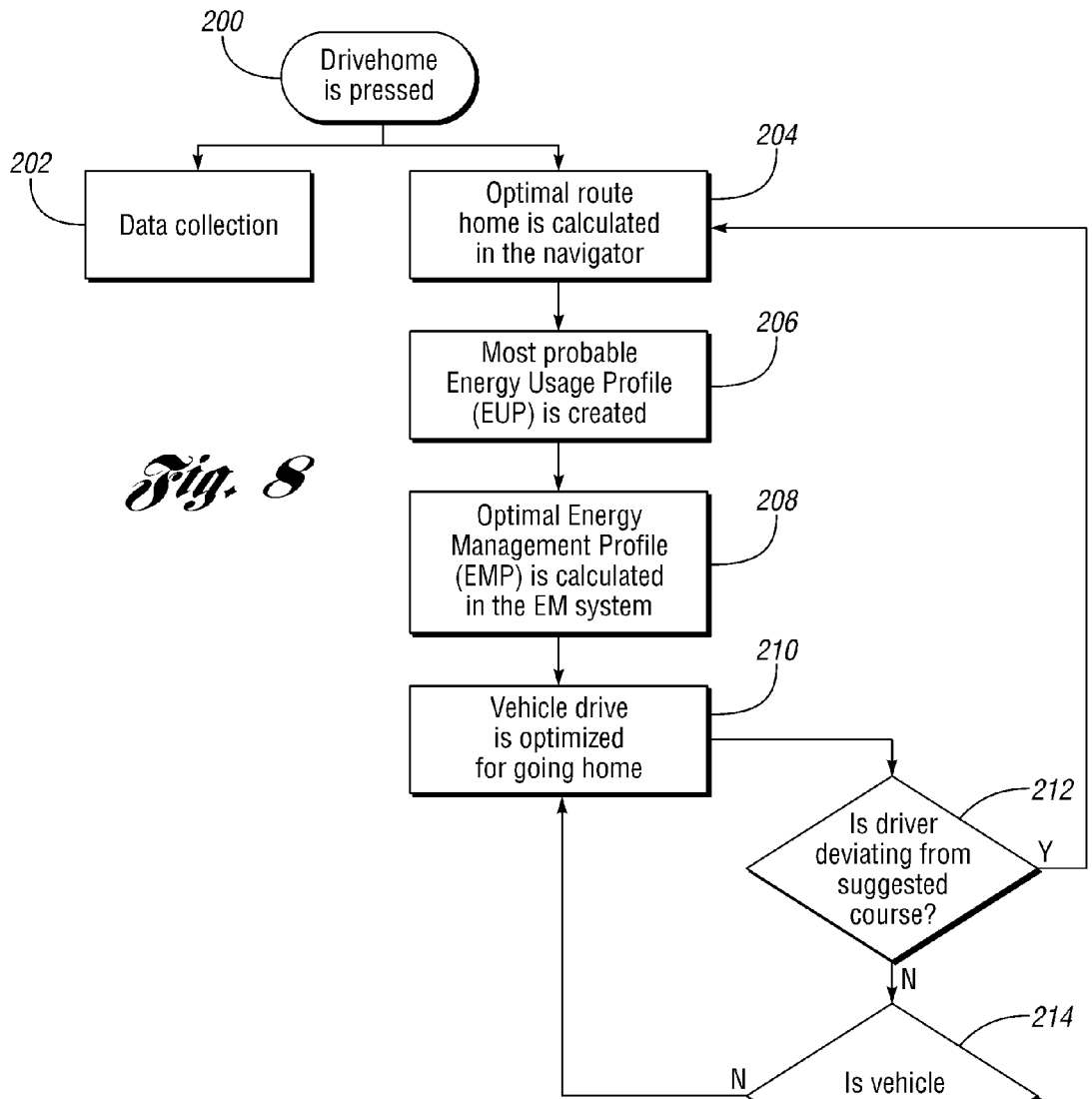
FIG. 8 is a strategy chart for the drive-home feature of the disclosure.

One embodiment of the disclosure is described in reference to FIG. 8. The algorithm begins when the drive-home button is actuated 200 by a vehicle operator. Two tracks are simultaneously activated: data collection 202 and home-trip optimization 204. Data collection 202 stores the current driving route, together with key factors such as speed and road grade, into a driving profile. In some embodiments, one or more of the time of day, day of the week, time of year, ambient conditions, and driving conditions are collected, as available. If the drive-home feature is canceled, all newly collected data are discarded. Otherwise, the data are post-treated and stored in an internal database when the vehicle reaches home.

Home-trip optimization 204 starts with the navigation system planning a suggested route to "home." It not only uses traditional navigation routes, but analyzes the driver's route preferences. In some embodiments in which real-time traffic and road conditions are available, such information is also used in the planning. In other embodiments, it is also possible to pre-define preferences in advance to allow the navigation system to calculate a Fastest, an EcoFriendly, a Preferred route, or other alternatives.

When the navigation system has planned the trip, this information is used by the drive-home system together with an analysis of all previously stored data to create an Energy Usage Profile (EUP) 206 that represents the most probable way that the driver drives during this trip. Since this profile is based on real data specific to the particular driver, it adapts to driving related factors that affect the energy management, such as slowdowns for speed bumps, frequent stops for stop signs or stop lights, higher torque demand for steep uphills, slow highway speeds due to congested traffic, etc. These factors tend to follow repeatable patterns and using advanced statistical analysis or pattern recognition techniques a most likely EUP can be created, which can adapt itself to the time of day, day of week, or weather conditions (if available). The EUP can be combined with other pre-defined special boundary conditions, such as "EV-only during the last 2 miles," to create an optimized energy management profile (EMP) 208. The default optimization is for fuel economy, but could also be adjusted for other drivability factors.

If no, or too few, historical data exist for the selected route, the prediction can still be made based on default settings and all other data available (distance, environmental data, etc).

After the EMP has been created in 208, the controller optimizes the PHEV energy management control 210 accordingly during the trip home. In 212, it is determined whether the driver deviates from the suggested course. If so, control is passed to 204 so that the navigation system re-routes the trip and a new EMP is created. Data collection 202 continues in spite of the deviation in the route since this might indicate a new preference in route to home. If no deviation, it determined whether the vehicle has reached home in 214. If not, control passes back to 210. If so, control passes to 216 in which the collected data 202 are classified and analyzed for patterns and stores the newly collected data into the database before the feature is turned off automatically. The system is deactivated in step 218. If the vehicle is stopped at a location determined not to be at home, the feature is turned off and no data is stored.

The drive-home feature can be engaged at anytime, even while driving—with one push on a drive-home button 102, shown in FIG. 1. The driver may turn off, or redefine, the feature. If the driver turns the feature off, all collected, but not classified, data are lost. However, in one embodiment, if the driver only makes a stop during his/her way home, the system remains active after the vehicle has been turned off and on. The button on the dashboard indicates this to the user. The above description is one non-limiting example embodiment.

When little or no data have been previously collected, the optimization is based solely on the navigation system's information. As data are collected, each trip builds up a network, or a "spiderweb" of trips, that all terminate at the home position. Routes originating at different places eventually merge into fewer and fewer route parts that yield higher accuracy of prediction closer to home.

To limit the storage space for the saved routes, the route is divided into a number of sections where each section is represented with average or typical route optimization factors (such as average speed, road grade, etc). Sections divisions are made both by distance (e.g. in ¼ mile intervals), but also when the system senses a big change in the inputs to the optimization factors (when significant changes in vehicle speed, road grade or driver input is detected).

Figure 9:
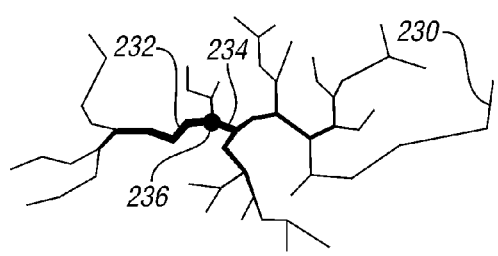
FIG. 9 shows a distribution frequency displayed in map form for a collected dataset.

FIG. 9 shows an example visualization of the collected dataset. The thickness of the line is related to how many data sets are stored for each section. For example, 230 may indicate a route only used once and routes 232 and 234 are routes that have been used hundreds of times getting to home 236.

In some embodiments, when the drive-home button is pressed, it indicates that the feature is active, such as by changing color of illumination, in one non-limiting example. At the same time driver interface 100 displays a drive-home screen in which the user may:
  obtain detailed information about the current route and profile home;
  select alternative pre-defined destinations;
  fine-tune the feature; and
  turn the feature off.

If the vehicle is equipped with voice recognition technology, activation/deactivation of the feature as well as selection of alternative pre-defined destinations may be commanded via voice input. The navigation system is also updated to use the predicted route home.

In the main vehicle settings for the PHEV in driver interface 100, there may be one entry for the drive-home feature. This allows the driver to perform initial or other changes to the feature, such as:
  defining the home location;
  defining alternative locations;
  defining special boundary conditions (such as "EV-only mode" during the last 2 miles);
  defining optimization strategy (fuel economy, drivability, etc.); and
  resetting the previously stored data.

FIG. 7 shows a human machine interface (HMI) example of the drive-home button when it is engaged. In some embodiments, the button is depressed once for most trips. When it is engaged, the default settings are used to optimize the drive home. Advanced features can be selected in driver interface 100 as desired. The current status of the feature is indicated with a small indicator light in the button. The feature turns itself off when the vehicle is turned off. The driver can always "change his/her mind" and disengage the feature by pressing the button again.

An advantage of embodiments of the disclosure is that a single button can be used to optimize the trip home. The optimization is based on a combination of a navigation system route and historical drive home data collected on prior trips to the home destination. The historical data may include geographical position of route or segments of the trip, associated with the vehicle power distribution and speed for the segments. Additionally, date and time associated with the trip home may be collected. In some alternatives, the drive home data are associated with the particular driver. The accuracy of the prediction as to the driving style on the trip home is improved by using real data from the driver. Thus, the commanded Energy Management Profile (208 of FIG. 8) can be optimized to largely discharge the battery as the vehicle approaches home. Furthermore, the last part of the trip can be on electric only as such portion of the trip is likely to be in a residential neighborhood in which quiet operation may be particularly desirable.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A plug-in hybrid electric vehicle (PHEV), comprising:
an internal combustion engine;
an electric motor;
an operator-actuated predetermined destination indicator configured to designate a predetermined destination; and
a vehicle system control (VSC) electronically coupled to the engine, motor, and indicator wherein the VSC bases commands to the engine and motor on both:
the predetermined destination indicator having been actuated since a start of a current trip; and
data collected from prior trips to the predetermined destination.

2. The PHEV of claim 1, further comprising:
a global positioning satellite (GPS) system electronically coupled to the VSC wherein data collected from prior trips to the predetermined destination comprise at least: vehicle speed and torque demand as a function of a location as determined by the GPS system.

3. The PHEV of claim 2 wherein the data collected from prior trips to the predetermined destination further comprises: time of day and day of the week.

4. The PHEV of claim 1, further comprising:
a receptacle coupled to the PHEV to enable the PHEV to be charged from an external electric power source.

5. The PHEV of claim 1 wherein the predetermined destination is a parking spot proximate an electrical outlet.

6. The PHEV of claim 1 wherein the predetermined destination is home.

7. A method to operate a plug-in hybrid electric vehicle (PHEV) having a battery, comprising:
determining whether an operator of the vehicle has indicated an intended destination by actuating a destination indicator coupled to the PHEV;
determining a most probable route to the indicated destination based on prior trips to the indicated destination;
predicting how much energy is expected to be expended en route to the intended destination based on the prior trips; and
operating the PHEV based on the predicted energy expected to be expended so that the battery is mostly discharged when the PHEV arrives at the indicated destination.

8. The method of claim 7 wherein:
the PHEV includes both an electric motor and an internal combustion engine; and
operation of the PHEV is predominantly provided by the electric motor closer to the indicated destination.

9. The method of claim 7 wherein the PHEV includes both an electric motor and an internal combustion engine; and the electric motor and the engine are commanded so that discharge of the battery occurs predominantly in a later portion of the route to the indicated destination.

10. The method of claim 7 wherein the operator of the vehicle further provides information to a vehicle system controller electronically coupled to the PHEV concerning an intermediate location at which the operator plans to stop en route to the indicated destination, the method further comprising:
predicting how much extended-trip energy is expected to be expended en route to the intended destination including the intermediate location based on prior trips to the intended destination including the intermediate location; and
operating the PHEV based on the predicted extended-trip energy expected to be expended so that the battery is substantially discharged when the PHEV arrives at the indicated destination.

11. The method of claim 7 wherein the indicated destination is a predetermined destination selected by an operator of the PHEV and is a destination at which the operator commonly charges the PHEV.

12. The method of claim 7, further comprising:
tracking routes that an operator of the PHEV chooses to travel in driving to the indicated destination;
storing the routes to the indicated destination; and
predicting the most probable route that the operator will travel to the indicated destination based on statistical analysis of stored data of routes taken during prior trips.

13. The method of claim 12, further comprising:
discarding data of the route to the indicated destination when the operator has actuated the destination indicator a second time.

14. The method of claim 7 wherein the destination indicator is a pushbutton coupled to an interior of the PHEV within reach of an operator.

15. The method of claim 7 wherein the destination indicator is an operator-controlled touch screen.

16. The method of claim 7 wherein the destination indicator is a voice-activated controller.

17. A plug-in hybrid electric vehicle (PHEV), comprising:
an internal combustion engine;
an electric motor coupled to the engine via a transmission;
an operator-actuated home indicator;
a global positioning system (GPS), and
a vehicle system control (VSC) electronically coupled to the engine, motor, GPS, and indicator wherein the VSC bases commands to the engine and motor on whether a vehicle operator has actuated the home indicator and GPS data collected during prior trips to home.

18. The PHEV of claim 17, further comprising:
a battery electronically coupled to the VSC and coupled to the electric motor wherein the VSC determines a most probable route to home based on the GPS data collected during prior trips to home and when the operator has actuated the home indicator, the VSC commands the electric motor so that the battery is substantially discharged when the PHEV arrives home.

19. The PHEV of claim 17 wherein the VSC further collects data on day of week and time of day associated with the GPS data and commands the electric motor further based on the day of week and time of day data.

20. The PHEV of claim 17 wherein the GPS data include geographical position of segments of prior trips to home associated with vehicle power distribution and speed for the segments.

* * * * *